US008141249B2

(12) United States Patent
DeMichael et al.

(10) Patent No.: US 8,141,249 B2
(45) Date of Patent: Mar. 27, 2012

(54) HEAT TREATING APPARATUS AND METHOD OF USING SAME

(75) Inventors: Thomas DeMichael, Stafford Springs, CT (US); Michael J. Labbe, Hebron, CT (US); Steven R. Bissell, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 1099 days.

(21) Appl. No.: 11/974,120

(22) Filed: Oct. 11, 2007

(65) Prior Publication Data

US 2009/0094832 A1 Apr. 16, 2009

(51) Int. Cl.
*B23P 6/00* (2006.01)

(52) U.S. Cl. .......................................... 29/889.1; 219/56

(58) Field of Classification Search .................. 219/534, 219/536, 56, 86.21, 86.24, 117.1, 118, 236, 219/270

See application file for complete search history.

(56) References Cited

U.S. PATENT DOCUMENTS 3,187,501 A * 6/1965 Quick ............................ 60/204
3,707,618 A * 12/1972 Zeitlin et al. .................. 392/503
4,358,663 A * 11/1982 Sperner et al. ................ 219/270
4,376,245 A * 3/1983 Lindskog et al. ............. 219/552
4,401,883 A * 8/1983 Watson ......................... 338/298
5,113,049 A 5/1992 Border et al.
5,389,184 A 2/1995 Jacaruso et al.
5,806,751 A 9/1998 Schaefer et al.
6,010,746 A 1/2000 Descoteaux et al.
6,350,969 B1 2/2002 Rothchild
6,748,646 B2 6/2004 Von Arx et al.
6,787,740 B2 9/2004 Smith et al.
6,993,811 B2 2/2006 Das et al.
7,034,259 B1 4/2006 Lokar et al.
7,185,432 B2 3/2007 Swaffar
7,244,320 B2 7/2007 Malley et al.
7,553,384 B2 * 6/2009 Groh ............................ 148/675
2003/0066434 A1 * 4/2003 Tomsich et al. ................. 99/385
2005/0183419 A1 * 8/2005 LaRocque et al. .............. 60/520
2007/0098468 A1 * 5/2007 Jang ............................. 399/333
2007/0267109 A1 * 11/2007 Kelly et al. ................... 148/516
2009/0159157 A1 * 6/2009 Tanaka et al. ................. 148/121

* cited by examiner

*Primary Examiner* — David Bryant
*Assistant Examiner* — Moshe Wilensky
(74) *Attorney, Agent, or Firm* — Kinney & Lange, P.A.

(57) ABSTRACT

An apparatus and method for heat treating the welded area of a repaired gas turbine engine component uses first and second heating elements. The heating elements each include an insulating tube supported by a support rod and wrapped with a conducing wire. One of the heating elements is sized to fit inside a recess in the gas turbine engine component, adjacent to the welded area, while the second heating element is placed outside the recess, but also adjacent to the welded area, thereby heating the welded area from two sides.

20 Claims, 2 Drawing Sheets

HEAT TREATING APPARATUS AND METHOD OF USING SAME

STATEMENT OF GOVERNMENT INTEREST

The U.S. government may have certain rights in this invention pursuant to Contract No. F33657-99-D-2051-0014 awarded by the United States Air Force.

BACKGROUND OF THE INVENTION

A gas turbine engine typically includes an augmenter, or afterburner, which produces additional thrust from the engine. Thrust augmentation is particularly useful in military aircraft, which often need brief periods of additional thrust during takeoff, climbing, or combat maneuvers. The augmenter typically is disposed in the exhaust section of the gas turbine engine. The gas flow of the augmenter is circumscribed by an augmenter liner and an augmenter case. The augmenter case is disposed outwardly in a radial direction from the augmenter liner, with a cooling space between them.

Augmenter cases include a cam follower track. During normal use of the gas turbine engine, the cam follower track of the augmenter case becomes worn. The high cost of augmenter cases makes it very desirable to repair the worn area of the cam follower track. Repairing the cam follower track of an augmenter case includes three basic steps: building up the worn area of the cam follower track using a welding process, heat-treating the built-up welded area of the cam follower track to relieve local stress, and machining the welded area of the cam follower track to conform to the desired dimensions.

The cam follower track of an augmenter case has an elongated shape. This elongated shape makes it difficult to provide heat treatment in a uniform manner to the welded area during the second step of the repair process.

Therefore, there is a need in the art for an apparatus to provide localized heat treatment of the welded area of a gas turbine engine component that is being repaired, such as the cam follower track of an augmenter case. It is important that the device provide sufficient heat for the stress-relief process, while also minimizing the amount of heat delivered to areas adjacent to the area being repaired.

BRIEF SUMMARY OF THE INVENTION

The invention is a heating apparatus and method that provides localized heat treatment to the welded area of a repaired gas turbine engine component. The heating apparatus includes two heating elements, the first of which is sized to fit inside a recess in the gas turbine engine component, and the second of which is sized to fit outside the recess, adjacent to the first heating element. The heating apparatus provides heat to the welded area from two sides and minimizes the heat delivered to other parts of the gas turbine engine component.

DETAILED DESCRIPTION OF THE INVENTION

Figure 1:
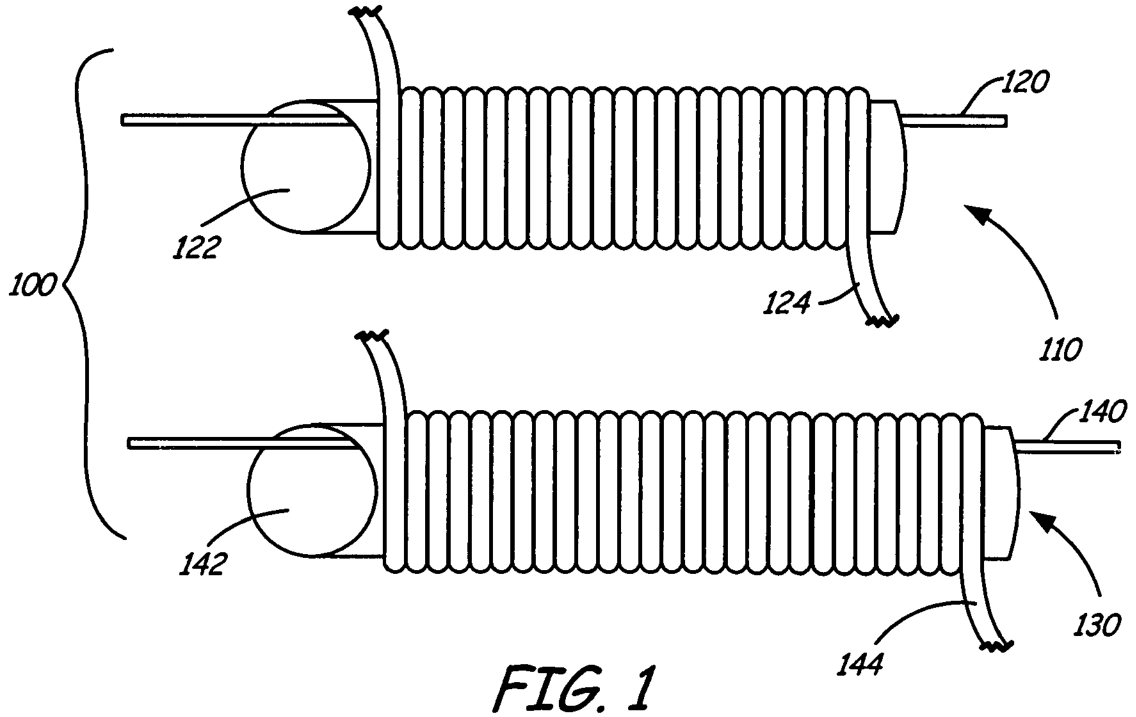
FIG. 1 shows one embodiment of a heating apparatus including two heating elements.

FIG. 1 shows heating assembly 100, which is used to provide localized heat treatment to the welded area of a cam follower track of an augmenter case that is being repaired. Heating assembly 100 includes heating element 110 and heating element 130, which are connected together in series (not shown). Heating element 110 of heating assembly 100 is sized to fit inside cam follower track 200 (FIG. 2), while heating element 130 is larger than heating element 110 and is designed to fit outside cam follower track 200.

Heating element 110 includes support rod 120, insulating tube 122 and conducting wire 124. Support rod 120 must be made of a material that can withstand the heating process without distortion, so that the heating process can be repeated many times. For example, support rod 120 may be made of INCONEL® 625, a nickel-based alloy that has significant strength through a very wide temperature range. Support rod 120 is located inside tube 122 and is used to support tube 122 in proper position. Tube 122 is made of a thermal insulator, typically a ceramic, such as alumina. Tube 122 is surrounded by wire 124, which is coiled around tube 122 to create a heating element. Wire 124 is made from a metal that has the appropriate resistance to create a heating element. For example, wire 124 may be made of NiCr, which is a well-known material that is available in many different diameters and resistances. Wire 124 is connected to a power supply and control system (not shown). For example, wire 124 may be connected to a 120 volt power supply and a proportional-integral-derivative (PID) controller.

Heating assembly 100 further includes heating element 130, which includes support rod 140, insulating tube 142 and conducting wire 144. Support rod 140, like support rod 120, must be made of a material that can withstand the heating process without distortion, such as INCONEL® 625 nickel-based alloy, so that the heating process can be repeated many times. Support rod 140 is placed inside tube 142 and is used to support tube 142 in place. Tube 142 is made of a thermal insulator, typically a ceramic, such as alumina. Tube 142 is surrounded by wire 144, which is coiled around tube 142 to create a heating element. Wire 144 is made from a metal, such as NiCr, that has the appropriate resistance to create a heating element. Wire 144, like wire 124, is also connected to the power supply and control system (not shown).

In repairing a damaged cam follower track in the augmenter case of a gas turbine engine, the first step is to build up the worn area of the cam follower track using any suitable welding process. Next, heating assembly 100 is used to provide local stress relief of the newly-welded area of the cam follower track. While heat treating the welded area of the repaired cam follower track, enough heat must be placed uniformly along the welded area to complete the stress relief cycle.

At the same time, it is desirable to minimize the heating of adjacent areas, such as nearby assembly rivets, which might be damaged by the high heat needed for stress relief. A gas turbine engine, including the augmenter case, is built with parts that have very close tolerances and must have specific dimensions in order to fit together with the other parts of the gas turbine engine. Heating of the augmenter case during repair of the cam follower track may alter those dimensions. Areas adjacent to the cam follower track, especially nearby assembly rivets, may be damaged if they are heated to the high temperature needed for local stress relief of the repaired area of the cam follower track. Assembly rivets, for example, must be kept below about 600° F. (315° C.).

It is also desirable to prevent surface contamination of the titanium augmenter case. The augmenter case is made of titanium, which is very sensitive to surface contamination. Temperature is the primary factor driving surface contamination of titanium, so heat treating increases the danger that the titanium surface of the augmenter case will become contaminated. Surface contamination of titanium begins around about 600° F. (315° C.), while heat treating of the welded area typically requires temperatures around about 1100° F. (595° C.).

Finally, a sharp temperature gradient between the welded area of the cam follower track that is being heated and the areas adjacent to it is not desirable. A sharp temperature gradient may introduce unwanted stress in the material of the augmenter case.

Figure 2:
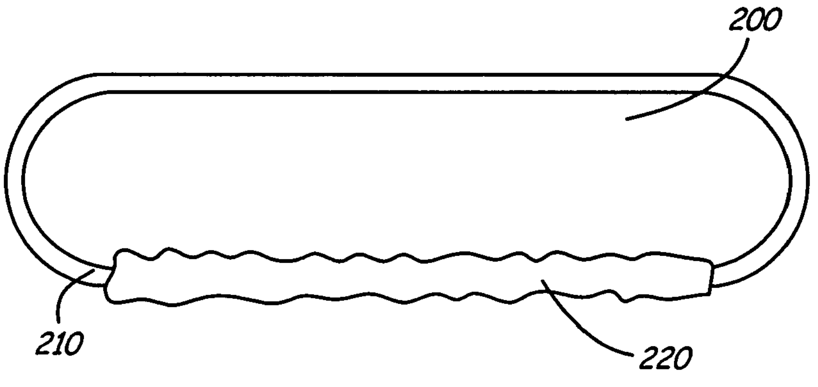
FIG. 2 shows a cam follower track with a welded area requiring local stress relief.
Figure 3:
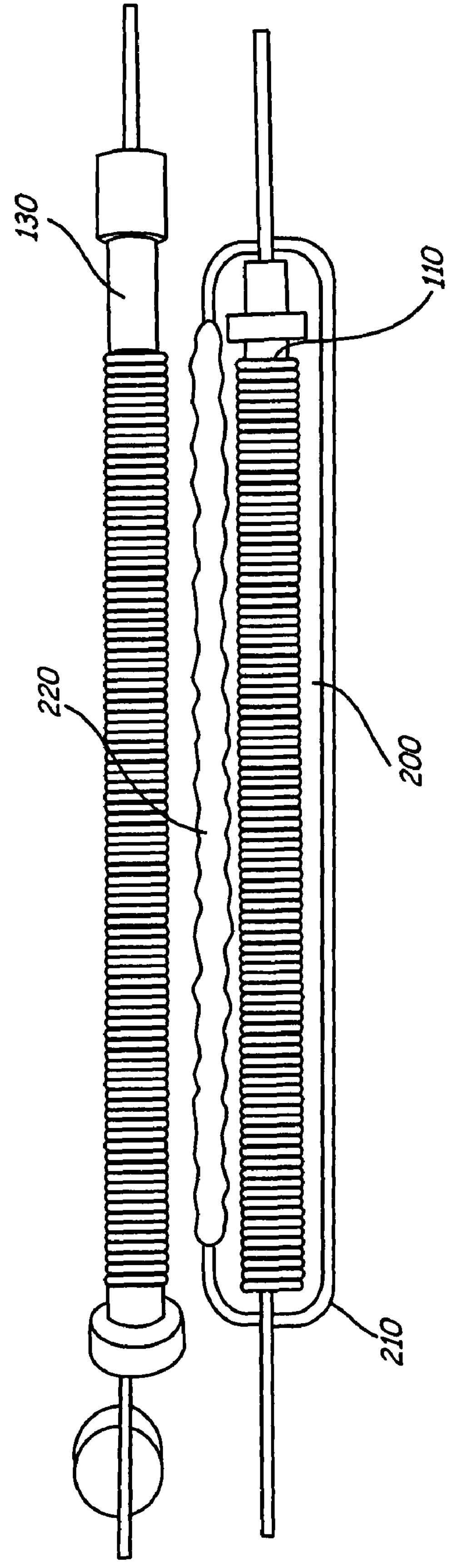
FIG. 3 shows the heating apparatus of FIG. 1 positioned in and proximate to the cam follower track of FIG. 2, with a welded area requiring local stress relief.

As shown in FIG. 2, the welded area 220 is along an edge 210 of cam follower track 200. As shown in FIG. 3, after the damaged area of the cam follower track has been built up during the welding step, heating element 110 is positioned inside cam follower track 200, adjacent to welded area 220. Heating element 130 is positioned outside of cam follower track 200, along the other side of welded area 220. In some applications, thermocouples may be attached along welded area 220 to monitor temperatures and control the heating process.

After heating element 110 and heating element 130 are properly positioned with respect to welded area 220, heating element 110 and heating element 130 are turned on for an appropriate amount of time to provide heat treatment to welded area 220. The two heating elements on either side of the welded area ensure thorough and uniform heating the welded area.

To reduce oxidation and contamination of the titanium augmenter case, the augmenter case may be sectioned off and sealed inside a polycarbonate tent, which is then filled with an inert gas, such as argon. Fans or focused air-cooling can be used to cool the exterior areas of the augmenter case that are not being heat-treated.

The area to be heat-treated is sealed inside the tent, and the inert gas is continuously pumped into the tent to eliminate, or at least minimize, the oxygen in the tent. Power is then applied to the heating elements until an appropriate temperature is obtained. In embodiments, the stress relief process calls for heating the augmenter case to a temperature of about 1100° F. (595° C.) and holding the augmenter case at that temperature for approximately 90 minutes in an inert gas atmosphere. Upon completion of the heating process, the heating elements are removed and the augmenter case is cooled to room temperature. The process can then be repeated on other cam follower tracks in the same case until all necessary repairs are completed.

The invention is a heating apparatus and method that provides localized heat treatment to the welded area of a repaired gas turbine engine component, such as the cam follower track of an augmenter case. The heating apparatus includes two heating elements, the first of which is sized to fit inside a recess in the engine component, such as the cam follower track, and the second of which is sized to fit outside the recess, adjacent to the first heating element. The heating apparatus provides heat to the welded area from two sides and, by focusing heat application on the welded area, the apparatus minimizes the heat delivered to other parts of the engine component.

Although the present invention has been described with reference to preferred embodiments, workers skilled in the art will recognize that changes may be made in form and detail without departing from the spirit and scope of the invention. For example, the heating apparatus could be used to locally heat treat any weld-repaired area on an engine case or engine hardware. Due to the round shape of the heating elements, this design is particularly advantageous for use in heat treating either inside or outside corners, or on edges where two surfaces meet.

The invention claimed is:

1. An apparatus for heat-treating a welded area of a repaired cam follower track of a gas turbine engine, the cam follower track comprising:

a first elongate and straight edge extending along the repaired cam follower track, the first elongate edge having the welded area;

a second elongate and straight edge extending along the repaired cam follower track spaced from the first elongate and straight edge to define an elongate and straight recess having inner dimensions, the apparatus comprising:

a first heating element sized to substantially mate with and abut the inner dimensions of the elongate and straight recess in the cam follower track, the first heating element positioned adjacent the welded area, the first heating element comprising:

a first insulating tube;

a first support rod inside the first insulating tube; and a first wire disposed around the outside of the first insulating tube; and a second heating element sized to fit along an outside of the cam follower track recess adjacent the welded area and being larger than the first heating element, the second heating element comprising:

a second insulating tube;

a second support rod inside the second insulating tube; and a second wire disposed around the outside of the second insulating tube; and wherein the first heating element fits between the first and second elongate and straight edges within the cam follower track elongate and straight recess, and the second heating element is disposed outside the cam follower track elongate and straight recess alongside the welded area of the first elongate and straight edge.

2. The apparatus of claim 1 wherein:

the first and second wires comprise NiCr;

the first and second rods comprise INCONEL® 625 nickel-based alloy; and the first and second insulating tubes are ceramic alumina.

3. The apparatus of claim 1 wherein the cam follower track is disposed on an augmenter case.

4. The apparatus of claim 1 wherein the first heating element and the second heating element are connected in series.

5. The apparatus of claim 1 wherein the cam follower track recess further comprises:

first and second arcuate end segments connecting the first elongate and straight edge to the second elongate and straight edge to define the inner dimensions such that the first elongate heating element fits inside the inner dimensions along the welded area.

6. An apparatus for heat-treating a welded edge of a repaired gas turbine engine cam follower track defining an elongate encircled interior, the apparatus comprising:

a first elongate and straight tubular heating element sized to fit along a first side of the welded edge of the cam follower track inside the encircled interior, the first elongate heating element comprising:

a first insulating tube;

a first support rod inside the first insulating tube; and a first wire disposed around the outside of the first insulating tube; and a second elongate and straight tubular heating element sized to fit along a second side of the welded edge of the cam follower track outside the encircled interior and opposite the first elongate heating element, the second elongate heating element comprising:

a second insulating tube;

a second support rod inside the second insulating tube; and a second wire disposed around the outside of the second insulating tube.

7. The apparatus of claim 6 wherein the first and second wires comprise NiCr.

8. The apparatus of claim 6 wherein the first and second rods comprise INCONEL® 625 nickel-based alloy.

9. The apparatus of claim 6 wherein the first and second insulating tubes are ceramic.

10. The apparatus of claim 9 wherein the ceramic is alumina.

11. The apparatus of claim 6 wherein the cam follower track is disposed on an augmenter case.

12. The apparatus for heat-treating a welded edge of a repaired gas turbine engine cam follower track defining an elongate encircled interior of claim 6 wherein the first elongate heating element is sized to substantially match inner dimensions of the elongate encircled interior.

13. A method for heat-treating a welded area of a repaired cam follower track of a gas turbine engine component, the method comprising:

positioning a first elongate heating element, sized to substantially match dimensions of an inside area of the cam follower track defined by a space between first and second elongate edges, such that the first heating element is adjacent the welded area;

positioning a second elongate heating element along an outside area of the cam follower track adjacent the welded area opposite the first heating element such that the welded area is interposed between the first and second elongate heating elements; and heating the welded area using the first and second elongate heating elements to relieve stress in the welded area.

14. The method of claim 13 wherein the first elongate heating element comprises:

a first insulating tube;

a first support rod inside the first insulating tube; and a first wire disposed around the outside of the first insulating tube; and the second elongate heating element comprises:

a second insulating tube;

a second support rod inside the second insulating tube; and a second wire disposed around the outside of the second insulating tube.

15. The method of claim 13 wherein at least one of the first wire and the second wire comprises NiCr.

16. The method of claim 13 wherein at least one of the first support rod and the second support rod comprises INCONEL® 625 nickel-based alloy.

17. The method of claim 13 at least one of the first insulating tube and the second insulating tube comprises a ceramic.

18. The method of claim 17 wherein the ceramic is alumina.

19. The method of claim 13 and further comprising the step of:

sectioning off the gas turbine engine component inside a sealed inert gas atmosphere; and applying air-cooling to non-heat treated portions of the gas turbine engine component.

20. The method for heat-treating a welded area of a repaired cam follower track of a gas turbine engine component of claim 13 wherein:

the space between the first elongate edge and the second elongate edge defines a width of the inside area of the cam follower track;

the first and second elongate edges define a length of the inside area of the cam follower track; and the length is greater than the width.

* * * * *